(12) United States Patent
Hassett

(10) Patent No.: US 9,157,226 B2
(45) Date of Patent: Oct. 13, 2015

(54) APPARATUS AND METHOD FOR INCREASING HYDRAULIC CAPACITY OF A SEWER

(71) Applicant: The White Oak Partnership, LP, Berwyn, PA (US)

(72) Inventor: Alan F. Hassett, Berwyn, PA (US)

(73) Assignee: THE WHITE OAK PARTNERSHIP LP, Berwyn, PA (US)

( * ) Notice: Subject to any disclaimer, the term of this patent is extended or adjusted under 35 U.S.C. 154(b) by 93 days.

(21) Appl. No.: 13/967,672

(22) Filed: Aug. 15, 2013

(65) Prior Publication Data

US 2013/0327214 A1 Dec. 12, 2013

Related U.S. Application Data

(63) Continuation of application No. PCT/US2012/025561, filed on Feb. 17, 2012.

(60) Provisional application No. 61/463,456, filed on Feb. 17, 2011.

(51) Int. Cl.
*E03F 5/08* (2006.01)
*E03F 1/00* (2006.01)
(Continued)

(52) U.S. Cl.
CPC . *E03F 5/08* (2013.01); *E03F 1/007* (2013.01); *E03F 5/101* (2013.01); *E03F 5/22* (2013.01); *Y10T 137/0318* (2015.04); *Y10T 137/402* (2015.04)

(58) Field of Classification Search
CPC ........... E03F 1/006; E03F 1/007; E03F 5/042; E03F 5/101; E03F 5/102; E03F 5/08; E03F 5/22; Y10T 137/0318; Y10T 137/402

USPC .......................................... 137/236.1, 565.23
See application file for complete search history.

(56) References Cited

U.S. PATENT DOCUMENTS 3,239,849 A 3/1966 Liljendahl
3,643,265 A 2/1972 Wiswell, Jr.
(Continued)

FOREIGN PATENT DOCUMENTS

EP 0644299 A2 3/1995
EP 1270832 A1 1/2003

OTHER PUBLICATIONS

International Search Report issued May 31, 2012 in International Application No. PCT/US 2012/025561.

*Primary Examiner* — Kevin Lee
(74) *Attorney, Agent, or Firm* — Panitch Schwarze Belisario & Nadel LLP

(57) ABSTRACT

A method for increasing hydraulic capacity of a gravity sewer system includes installing a receiving structure within or proximate to at least a portion of the gravity sewer system. The receiving structure has at least one fluid inlet opening, at least one liquid outlet opening, and at least one gas outlet opening. The method further includes evacuating at least some of any gas within the receiving structure through at least one gas outlet opening to create a vacuum within the receiving structure. The method further includes receiving a flow of at least liquid through the at least one fluid inlet opening of the receiving structure and into the receiving structure. The method further includes discharging at least some of the liquid from the receiving structure through the at least one liquid outlet opening of the receiving structure.

18 Claims, 2 Drawing Sheets

(51) Int. Cl.
  *E03F 5/10* (2006.01)
  *E03F 5/22* (2006.01)

(56) References Cited

U.S. PATENT DOCUMENTS

| | | | |
|---|---|---|---|
| 3,686,693 A | 8/1972 | Liljendahl | |
| 3,746,032 A | 7/1973 | Wallgren | |
| 4,108,192 A | 8/1978 | Michael | |
| 4,155,851 A | 5/1979 | Michael | |
| 4,179,371 A | 12/1979 | Foreman et al. | |
| 4,184,506 A | 1/1980 | Varis et al. | |
| 4,232,409 A | 11/1980 | Van Pham | |
| 4,246,925 A | 1/1981 | Oldfelt | |
| 4,333,487 A | 6/1982 | Michael | |
| 4,357,719 A | 11/1982 | Badger et al. | |
| 4,376,444 A | 3/1983 | Michael | |
| 4,392,128 A | 7/1983 | Young et al. | |
| 4,603,709 A | 8/1986 | Huisma | |
| 4,791,949 A | 12/1988 | Tank | |
| 4,928,326 A | 5/1990 | Olin et al. | |
| 5,100,266 A | 3/1992 | Ushitora et al. | |
| 5,114,280 A | 5/1992 | Ushitora et al. | |
| 5,133,853 A | 7/1992 | Mattsson et al. | |
| 5,165,457 A | 11/1992 | Olin et al. | |
| 5,214,807 A | 6/1993 | Terve | |
| 5,487,646 A * | 1/1996 | Ushitora et al. | 137/205 |
| 5,575,304 A | 11/1996 | Hassett | |
| 2010/0031432 A1 | 2/2010 | Lappalainen | |
| 2010/0170151 A1 | 7/2010 | Huber | |

\* cited by examiner

APPARATUS AND METHOD FOR INCREASING HYDRAULIC CAPACITY OF A SEWER

CROSS-REFERENCE TO RELATED APPLICATION

The present application is a continuation application of International Application No. PCT/US2012/025561, filed Feb. 17, 2012, which was published on Aug. 23, 2012, under International Publication No. WO 2012/112838 A1, and which claims the benefit of U.S. Provisional Patent Application No. 61/463,456, filed Feb. 17, 2011 and entitled "A System and Method For Increasing Hydraulic Capacity of an Existing Sewer for Use With Combined Sewer Systems and Sanitary Sewer Systems," the entire contents of all of which are incorporated by reference herein.

BACKGROUND OF THE INVENTION

The present invention is directed generally to an apparatus and method for increasing the hydraulic capacity of a sewer system. More particularly, the present invention is directed to a receiving structure positioned within or proximate to an existing gravity sewer system for increasing the hydraulic capacity of the sewer system during a period in which the capacity of the existing sewer system would otherwise be exceeded.

Combined sewer systems were the "state-of-the-art" during the early 20th century. In addition to the collection and transport of municipal wastewater, these combined sewers were designed for stormwater flows as well—therefore the term "combined." The design of combined sewer systems included "overflow structures." When a wet weather event (for example, a storm, heavy rain or snowmelt) created stormwater flows which exceeded the design capacity (i.e., hydraulic capacity) of the combined sewer system, the excess flow (i.e., the combined sewer overflow "CSO") would be intentionally diverted to nearby surface water via these overflow structures.

Later in the 20th century, the "state-of-the-art" shifted to the design and construction of separate sewers—individual sewer systems for municipal wastewater and stormwater. The design capacity of the sanitary sewer was intended to collect and transport municipal wastewater from the service area. Experience has shown that unintended water from non-municipal sources (i.e., stormwater) also enters the sanitary sewers. During wet weather events these excessive flows create sanitary sewer overflows ("SSO") at locations which were not intentionally designed to accommodate such overflows.

One example of a prior art sewer system is shown in FIG. 1. The prior art sewer system, generally designated 12, typically includes an upstream portion, pipe or conduit 12a and a downstream portion, pipe or conduit 12b. The downstream conduit 12b typically has an existing capacity (due to size, slope, etc.) which is greater than the increased capacity desired for the upstream conduit 12a. The downstream conduit 12b is typically connected to or leads to a treatment facility (not shown). The upstream and downstream conduits 12a, 12b may be operatively connected by a manhole or other open area 40 having a removable manhole cover or lid 42 to provide access to the manhole 40.

At full-flow of a liquid, such as wastewater, stormwater, or a combination of wastewater and stormwater, a hydraulic gradient 14 is typically parallel to the slope of the upstream conduit 12a. While normally depicted above the upstream conduit 12a, in FIG. 1 the hydraulic gradient 14 is intentionally shown beneath the upstream conduit 12a in order to more clearly demonstrate the effect of the present invention. The upstream and downstream conduits 12a, 12b have a certain hydraulic capacity at full-flow of a liquid, which is determined by its size, shape and/or material-of-construction and its hydraulic gradient 14. Upstream flows (i.e., to the left in FIG. 1) in excess of this full-flow hydraulic capacity will cause the liquid in the upstream conduit 12a to back-up and overflow.

The current approach taken by the United States Environmental Protection Agency ("USEPA") to deal with the issue of CSO and SSO environmental impacts is based on legally-binding "Consent Decree" agreements between the USEPA and the sewer system entity—typically a municipal government or agency. The individually-negotiated Consent Decrees include a scope-of-work and schedule intended to reduce the frequency and volume of CSO during wet weather events.

The scope-of-work includes an assessment and evaluation of technically-feasible alternatives. Where increased hydraulic capacity is needed in order to reduce the frequency and volume of overflows, the typical alternatives often considered are parallel sewers and/or tunnels. Such alternatives are often very expensive solutions to deal with short-duration problems created by only a few wet weather events annually.

Therefore, it would be desirable to create an apparatus and method that alleviates or overcomes the above-described disadvantages of conventional sewer systems. More specifically, it would be desirable to create an attachment or addition to existing gravity sewer systems that—when necessary or desired—increases the hydraulic capacity of the sewer system, which is preferably an established or existing gravity sewer system. The present invention accomplishes the above objectives.

BRIEF SUMMARY OF THE INVENTION

Briefly stated, a preferred embodiment of the present invention is directed to a method for increasing hydraulic capacity of an existing gravity sewer system. The method includes installing a receiving structure within or proximate to at least a portion of the existing gravity sewer system. The receiving structure has at least one fluid inlet opening, at least one liquid outlet opening, and at least one gas outlet opening. The method further includes evacuating at least some of any gas within the receiving structure through at least one gas outlet opening to create a vacuum within the receiving structure. The method further includes receiving a flow of at least liquid through the at least one fluid inlet opening of the receiving structure and into the receiving structure. The method further includes discharging at least some of the liquid from the receiving structure through the at least one liquid outlet opening of the receiving structure.

In another aspect, a preferred embodiment of the present invention is directed to an apparatus for increasing hydraulic capacity of an existing gravity sewer system. The apparatus includes a receiving structure operatively connected to the existing gravity sewer system. The receiving structure includes at least one fluid inlet opening, at least one liquid outlet opening, and at least one gas outlet opening. At least one vacuum device is operatively connected to the at least one gas outlet opening of the receiving structure. At least one liquid evacuation device is operatively connected to the at least one liquid outlet opening.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
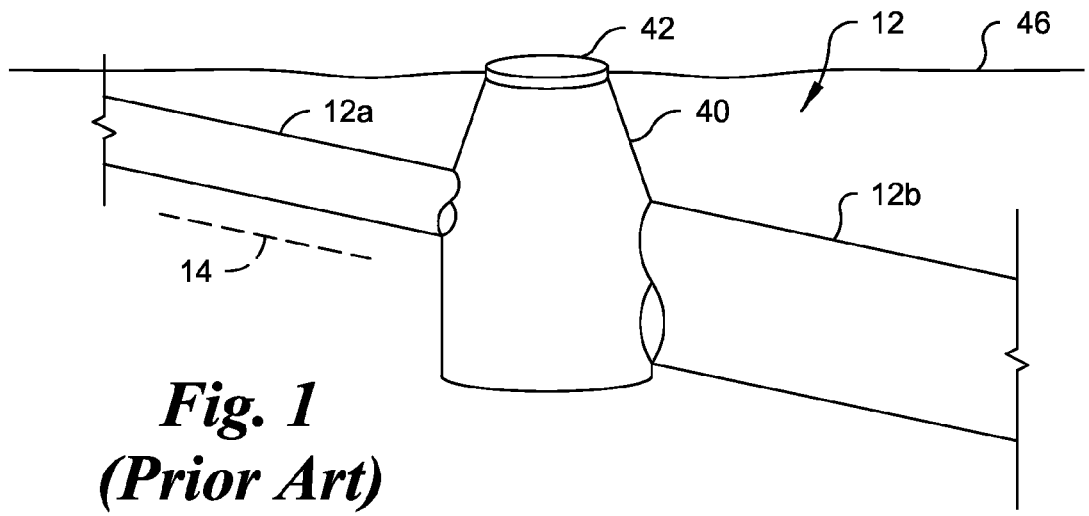
FIG. 1 is a schematic elevation view of a prior art gravity sewer system.

Certain terminology is used in the following description for convenience only and is not limiting. The words "left," "top," "up" and down," and derivatives thereof, designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Figure 2:
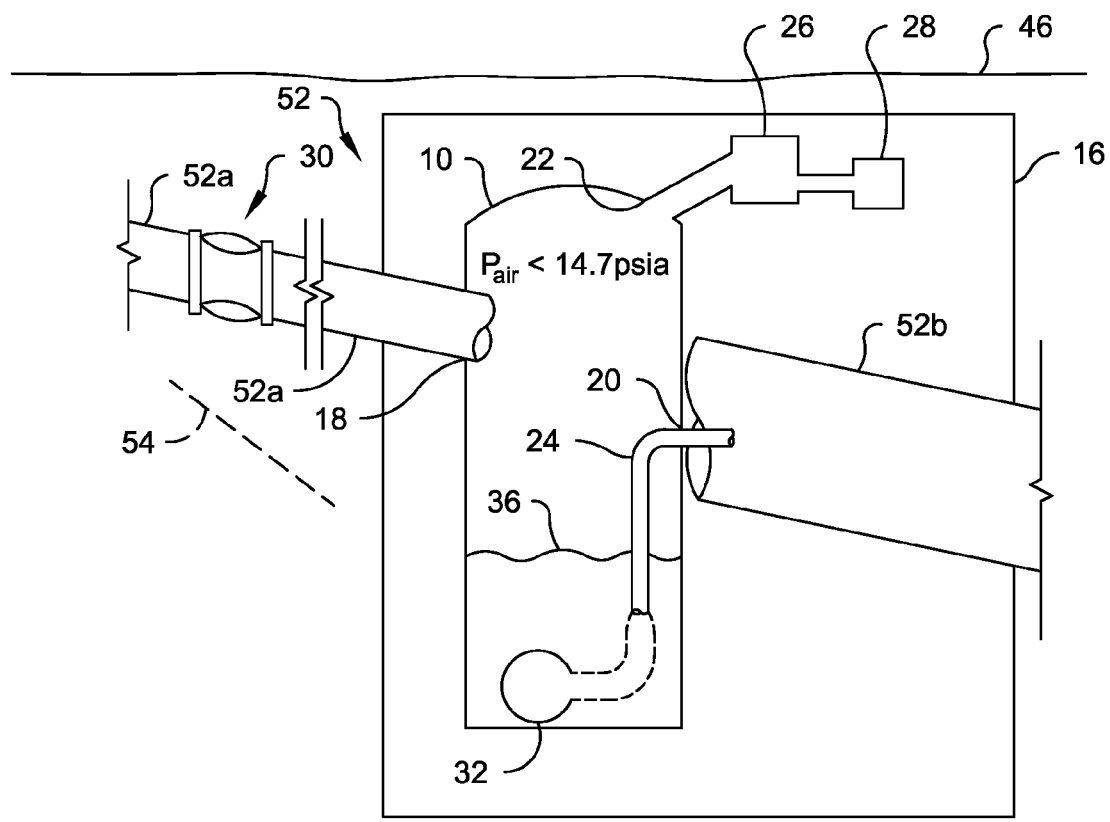
FIG. 2 is an enlarged schematic elevation view of an apparatus according to a first preferred embodiment of the present invention that is installed within or placed proximate to an existing gravity sewer system.
Figure 3:
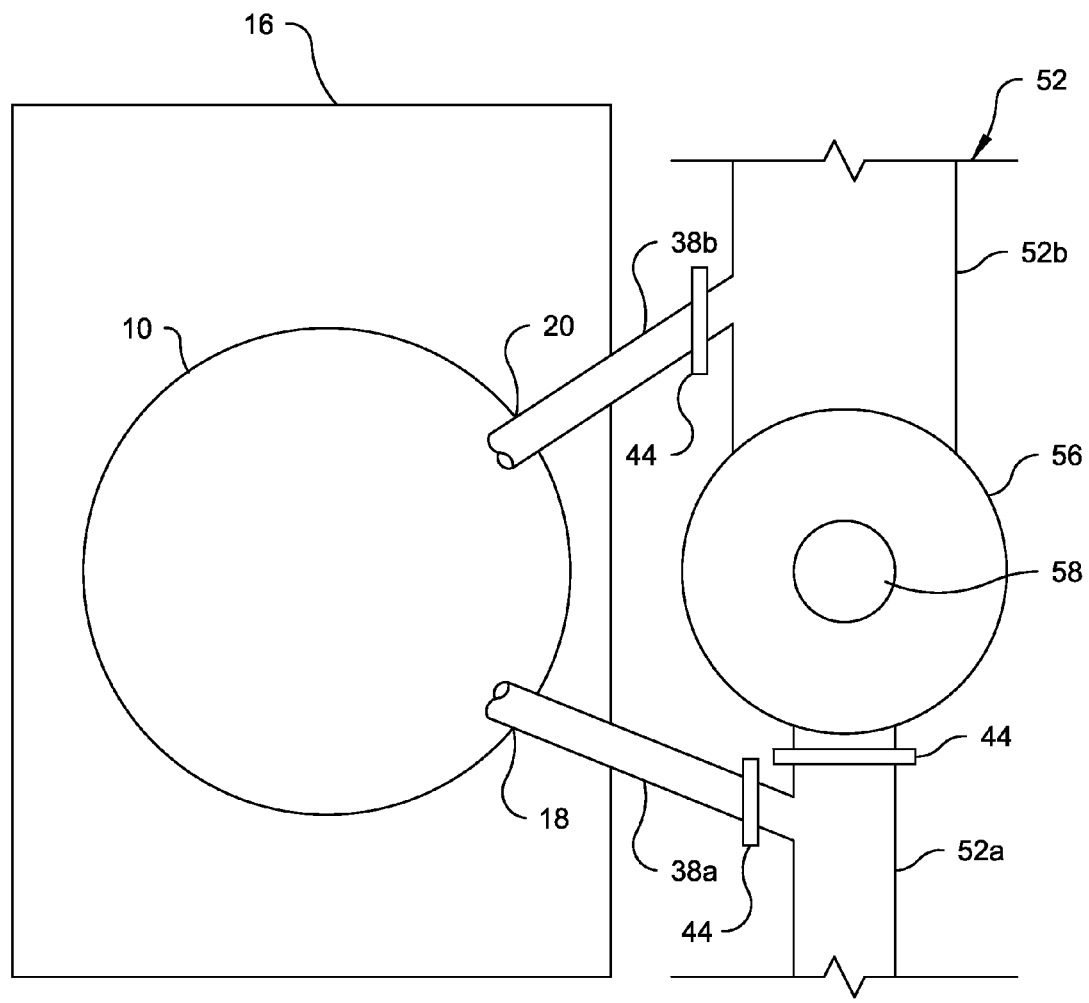
FIG. 3 is a schematic top plan view of an apparatus according to a second preferred embodiment of the present invention that is installed proximate to and is operatively connected to an existing gravity sewer system.

Referring to the drawings, wherein like numerals indicate like elements throughout, FIGS. 2 and 3 show preferred embodiments of an apparatus for increasing the hydraulic capacity of a gravity sewer system, generally designated 52. The apparatus is preferably operatively connected to the sewer system 52, which is preferably an existing, established, installed and/or operating gravity sewer system having a plurality of interconnected pipes or conduits, some of which may have varying sizes and/or cross-section areas.

Referring specifically to FIG. 2, the apparatus of the present invention preferably includes a receiving structure, generally designated 10, that is surrounded and/or enclosed by a housing structure 16. It is preferred that the receiving structure 10 is installed at least partially within or proximate to the existing sewer system 52. The receiving structure 10 preferably includes at least one fluid inlet opening 18, at least one liquid outlet opening 20 and at least one gas outlet opening 22. The fluid inlet opening 18 is preferably operatively connected and/or directly connected to a upstream conduit 52a of the sewer system 52 such that at least liquid, and possibly gas (i.e., air), enters the receiving structure 10 from the upstream conduit 52a. The term "fluid" used herein may encompass both liquid(s) (i.e., water) and gas(es) (i.e., air). Further, the liquid outlet opening 20 is preferably operatively connected, but preferably not directly connected, to a downstream conduit 52b of the sewer system 52 such that at least liquid exits the receiving structure 10 and enters the downstream conduit 52b. While normally depicted above the upstream conduit 52a, in FIG. 2 the hydraulic gradient 54 is intentionally shown beneath the upstream conduit 52a in order to more clearly demonstrate the effect of the present invention. At least one liquid outlet conduit 24 may extend from within the receiving structure 10, through the liquid outlet opening 20, and into the downstream conduit 52b. Thus, the liquid conduit 24 may connect the liquid outlet opening 20 of the receiving structure 10 to the downstream conduit 52b.

In one preferred embodiment, the entire housing structure 16 may be positioned below grade or ground level 46. Alternatively, in another preferred embodiment, a first portion of the housing structure 16 may be positioned below grade or ground level 46, and a second portion of the housing structure 16 may be positioned above grade or ground level 46. In such an alternative embodiment, the first and second portions of the housing structure 16 may be operatively connected by a passageway or conduit.

Preferably, any gas or air within receiving structure 10 is caused to have an internal vacuum, such that the air pressure $P_{air}$ within the receiving structure 10 is preferably less than fourteen and seven tenths pounds per square inch absolute (14.7 psia). Fourteen and seven tenths pounds per square inch absolute (14.7 psia) is approximately equal to thirty four (34) feet w.c. (water column). In other words, for example, a column of water thirty four (34) feet high would create a pressure of approximately fourteen and seven tenths pounds per square inch absolute (14.7 psia) at the base of the column. While a perfect vacuum is impractical for actual operation, if the gas or air within the receiving structure 10 was eliminated in order to create a perfect vacuum, the hydraulic gradient 54 at the downstream end of the upstream conduit 52a in FIG. 2 would be approximately thirty four (34) feet lower than the hydraulic gradient 14 at the downstream end of the upstream conduit 12a in FIG. 1.

Further, the apparatus preferably includes at least one vacuum device 26 operatively connected to the gas outlet opening 22 of the receiving structure 10 to create and maintain the desired and/or proper sub-atmospheric air pressure within the receiving structure 10. The vacuum device 26 may be a vacuum pump, such as a liquid ring vacuum pump, or another device such as an industrial fan. Further, a plurality of vacuum devices 26 may be arranged in series or in parallel with respect to the gas outlet opening 22. The equipment and controls for these vacuum wastewater systems are well known by those skilled in the art, and further description thereof is not necessary for a full and complete understanding of the present invention.

In actual practice, the design and operation of the preferred embodiment of the present invention will be site-specific and dependent upon creating the increased hydraulic capacity desired. In actual practice, it will be practical to operate so that the air pressure within the receiving structure 10 is caused to be in-the-range-of approximately six sevenths to three sevenths ($6/7$-$3/7$) of atmospheric pressure thereby lowering the hydraulic gradient 54 at the downstream end of the upstream conduit 52a by approximately five to twenty feet (5-20 ft.) and thereby substantially increasing the hydraulic capacity of the upstream conduit 52a of the existing sewer system 52.

At least one odor control device 28 may be operatively connected to the vacuum device(s) 26. Alternatively, the odor control device 28 may be operatively connected to the gas outlet opening 22 of the receiving structure 10. The equipment and controls for these odor control devices and systems are known by those skilled in the art, and further description thereof is not necessary for a full and complete understanding of the present invention. The vacuum device 26 and/or the odor control device 28 may be located entirely within the housing structure 16, below grade or ground level 46, or outside the housing structure 16 and above grade or ground level 46.

At least some or all of the liquid which enters the receiving structure 10 through the fluid inlet opening 18 is preferably discharged from the receiving structure 10 via the outlet opening 20. In the first preferred embodiment shown in FIG. 2, at least one liquid evacuation device 32 is operatively connected to the liquid outlet opening 20, and more preferably directly connected to the liquid outlet conduit 24. The liquid evacuation device 32 may be a liquid pump or an airlift pump, and preferably moves or pumps the water into and through the liquid outlet conduit 24 and/or the liquid outlet opening 20. The equipment and controls for outlets for these vacuum wastewater systems are known by those skilled in the art, and further description thereof is not necessary for a full and complete understanding of the present invention. The liquid evacuation device 32 may be located entirely within the receiving structure 10, or may be located outside of the receiving structure 10, such as within the housing structure 16.

It is preferred that the apparatus, and thus the receiving structure 10, increases hydraulic capacity of the existing sewer system 52 only when needed or during periods when the maximum capacity of the existing sewer system 52 would otherwise be exceeded. Alternatively or additionally, the receiving structure 10 may increase hydraulic capacity of the existing sewer system 52 when used in conjunction or collaboration with other devices, such as one or more inflatable dams, for real-time management of system-wide controls during wet weather events. In other words, a preferred use of the present invention is to temporarily increase the hydraulic capacity of an existing section of the sewer system 52—perhaps for only a few hours during each of only a few wet weather events per year. As understood by those skilled in the art, an existing sewer system 52, such as one constructed years ago, could be modified or adjusted to meet structural or anti-infiltration objectives and/or retrofitted to accommodate or attach to one or more receiving structures 10, which could be in series or in parallel.

Furthermore, the increase in hydraulic capacity is preferably widely adjustable (by selectively controlling the vacuum level in the receiving structure 10, for example) and can be tailored to match the conditions created by specific wet weather events when they occur. The capital and operating cost savings possible through the use of the present invention are desirable when compared to the very expensive alternatives of parallel sewers and/or tunnels for the reduction of CSO frequency and volume; and also, for wastewater and stormwater management.

During operation, a flow rate of liquid entering the receiving structure 10 through the fluid inlet opening 18 may be generally equal to a flow rate of liquid exiting the receiving structure 10 through the liquid outlet opening 20. Alternatively, the flow rate of the liquid through the fluid inlet opening 18 may be substantially greater than the flow rate through the liquid outlet opening 20 when storage or equalization is practiced.

The receiving structure 10 and/or the housing structure 16 may be used to provide storage or equalization for any liquid that exceeds the capacity of the downstream conduit 52b or treatment facilities located downstream of receiving structure 10. As shown in FIG. 2, it is preferred that during operation a top level or surface 36 of the liquid within the receiving structure 10 is vertically below the entire fluid inlet opening 18.

The resulting flow regime within the upstream conduit 52a may be single-phase (i.e., liquid only) or two-phase flow consisting of liquid plus gas, such as air. Even when designed and operated for two-phase flow, it may be desired to minimize and/or control the introduction of gas (air) into the upstream conduit 52a. While not necessary, as a means to limit or control atmospheric air entering the upstream conduit 52a, a device such as modulating device 30 of FIG. 2 could be used. This modulating device 30 is preferably a valve, and more preferably may be comprised of a Type A Megaflex pinch valve as manufactured by the Red Valve Company of Carnegie Pa. It is preferred that the modulating device 30 can be controlled and operated so as to maintain full-flow conditions in the upstream conduit 52a upstream of modulating device 30 and also upstream of existing side inlet sewer pipe connections (not shown). Maintaining full-flow conditions will create a water seal which will limit or prevent atmospheric air from entering the conduit 52a.

FIG. 3 shows a second preferred embodiment of the housing structure 16 operatively connected or attached to the existing sewer system 52. In FIG. 3, like numerals are utilized to identify like elements shown in FIG. 2 and described in detail above. Certain elements of the apparatus described above are omitted from FIG. 3 for convenience. In the second preferred embodiment, the fluid inlet opening 18 of the receiving structure 10 is connected to the upstream conduit 52a of the existing sewer system 52 by a first connection passageway 38a. Similarly, it is preferred that the liquid outlet opening 20 of the receiving structure 10 is connected to the downstream conduit 52b of the existing sewer system 52 by a second connection passageway 38b. FIG. 3 shows the housing structure 16 laterally spaced-apart from or to the left of the existing sewer system 52, a manhole or other open area 56, and a removable manhole cover or lid 58 of the existing sewer system 52. However, the present invention is not so limited.

In the second preferred embodiment, at least one diversion device 44 is positioned between the fluid inlet opening 18 of the receiving structure 10 and the upstream conduit 52a. Furthermore, another diversion device 44 is preferably positioned within the upstream conduit 52a at least slightly downstream of the connection between the first connection passageway 38a and the upstream conduit 52a. In addition, another diversion device 44 is preferably positioned between the liquid outlet opening 20 of the receiving structure and the downstream conduit 52b. At least a portion of each diversion device 44, such as a sluice gate, slide gate, MegaFlex® pinch valve, or inflatable dam, is preferably movable between an open position to allow the passage of fluid and a closed position to prevent the passage of liquid. As understood by those skilled in the art, it is possible to configure the diversion devices 44 such that liquid is permitted to enter the first connection passageway 38a and prevented from continuing through the upstream conduit 52a to the downstream conduit 52b during a wet weather event. Alternatively, during periods when the existing sewer system 52 is capable of handling the liquid flow therethrough, the diversion devices 44 are operated and arranged to permit liquid flow from the upstream conduit 52a to the downstream conduit 52b, but prevent liquid flow through the first and second connection passageways 38a, 38b. In other words, the diversion devices 44 direct or divert the flow of liquid as desired. Each diversion device 44 may be electrically, hydraulically, pneumatically or manually operated.

It will be appreciated by those skilled in the art that changes could be made to the embodiment described above without departing from the broad invention concept thereof. It is understood, therefore, that this invention is not limited to the particular embodiments disclosed, but is intended to cover modifications within the spirit and scope of the present invention. Further, it should be appreciated that the drawings of the present application do not necessarily show various portions of the present invention to proper scale, but those of ordinary skill in the art would appreciate the proper scale and/or size ratios of the various components of the present invention.

I claim:

1. A method for increasing hydraulic capacity of a gravity sewer system, the method comprising:

installing a receiving structure within or proximate to at least a portion of the gravity sewer system, the receiving structure having at least one fluid inlet opening, at least one liquid outlet opening, and at least one gas outlet opening;
  evacuating at least some of any gas within the receiving structure through the at least one gas outlet opening to create a vacuum within the receiving structure;
  receiving a flow of at least liquid through the at least one fluid inlet opening of the receiving structure and into the receiving structure; and
  discharging at least some of the liquid from the receiving structure through the at least one liquid outlet opening of the receiving structure.

2. The method according to claim 1, wherein a flow rate of liquid through the at least one fluid inlet opening of the receiving structure is approximately equal to a flow rate of liquid through the at least one liquid outlet opening of the receiving structure.

3. The method according to claim 1, further comprising:
  storing at least some of the liquid in the receiving structure such that a flow rate of liquid through the at least one fluid inlet opening of the receiving structure is substantially more than a flow rate of liquid through the at least one liquid outlet opening of the receiving structure.

4. The method according to claim 1, wherein the method is performed only during periods when the capacity of the gravity sewer system would otherwise be exceeded.

5. The method according to claim 1, wherein the method is performed when the receiving structure is used in conjunction with one or more devices for real-time management of system-wide controls during wet weather events.

6. The method according to claim 1, further comprising:
  diverting liquid within the gravity sewer system into the at least one fluid inlet opening of the receiving structure.

7. The method according to claim 1, further comprising:
  reducing any odor exiting the receiving structure.

8. An apparatus for increasing hydraulic capacity of a gravity sewer system, the apparatus comprising:
  a receiving structure operatively connected to a gravity sewer system, the receiving structure including:
    at least one fluid inlet opening operatively connected to an upstream section of the gravity sewer system;
    at least one liquid outlet opening operatively connected to a downstream section of the gravity sewer system; and
    at least one gas outlet opening;
  at least one vacuum device operatively connected to the at least one gas outlet opening of the receiving structure; and
  at least one liquid evacuation device operatively connected to the at least one liquid outlet opening.

9. The apparatus according to claim 8, wherein the receiving structure increases hydraulic capacity of the gravity sewer system only when needed or during periods when a maximum capacity of the gravity sewer system would otherwise be exceeded.

10. The apparatus according to claim 8, wherein the receiving structure increases hydraulic capacity of the gravity sewer system when used in conjunction with one or more devices for real-time management of system-wide controls during wet weather events.

11. The apparatus according to claim 8, wherein the at least one liquid evacuation device is one of a liquid pump and an airlift pump.

12. The apparatus according to claim 8, wherein the at least one liquid evacuation device is located entirely within the receiving structure.

13. The apparatus according to claim 8, wherein during operation a flow rate of liquid entering the at least one fluid inlet opening is generally equal to a flow rate of liquid exiting the at least one liquid outlet opening.

14. The apparatus according to claim 8, wherein during operation a flow rate of liquid entering the at least one fluid inlet opening of the receiving structure is substantially greater than a flow rate of liquid exiting the at least one liquid outlet opening.

15. The apparatus according to claim 8, wherein during operation a top level of liquid within the receiving structure is vertically below the entire at least one fluid inlet opening.

16. The apparatus according to claim 8, wherein the at least one vacuum device is one of a vacuum pump and an industrial fan.

17. The apparatus according to claim 8, further comprising:
  an odor control device operatively connected to the at least one gas outlet opening of the receiving structure or the vacuum device.

18. The apparatus according to claim 8, further comprising:
  a diversion device positioned between the at least one fluid inlet opening of the receiving structure and the upstream section of the gravity sewer system, the diversion device being movable between an open position to permit fluid to enter the at least one fluid inlet opening and a closed position to prevent liquid from entering the at least one fluid inlet opening.

* * * * *